April 6, 1937.  J. A. BUCHANAN  2,076,118
PISTON
Filed March 30, 1936
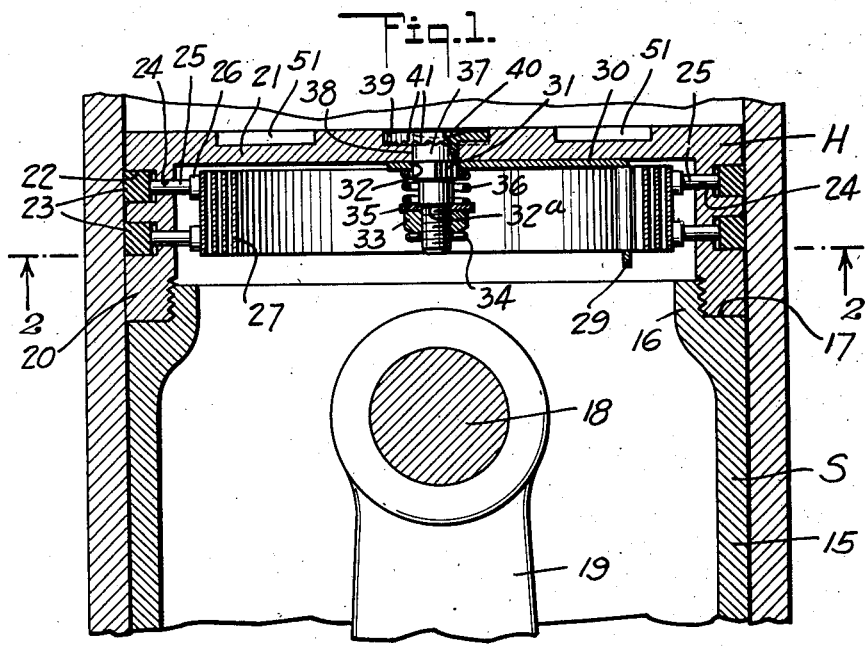
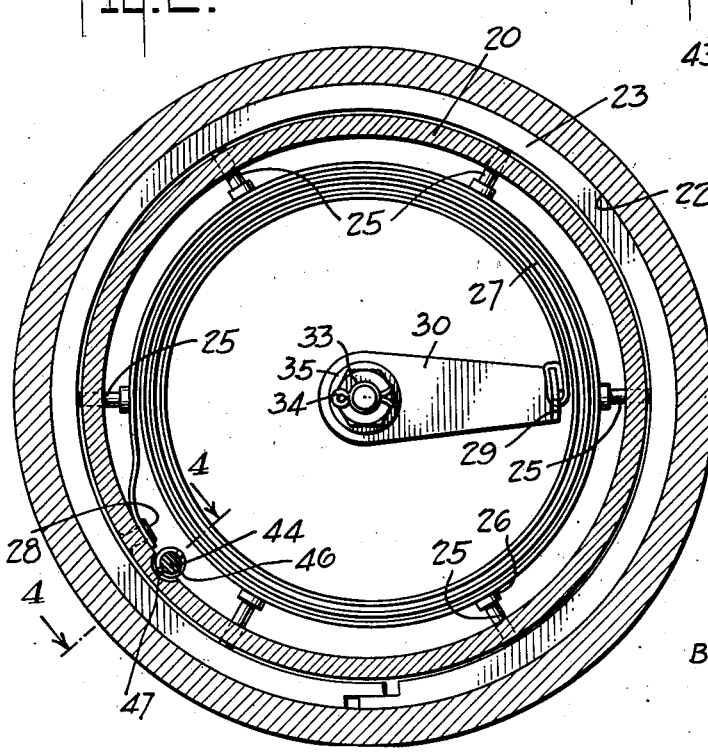
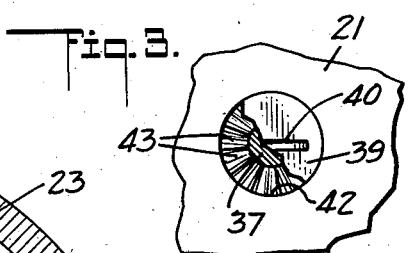
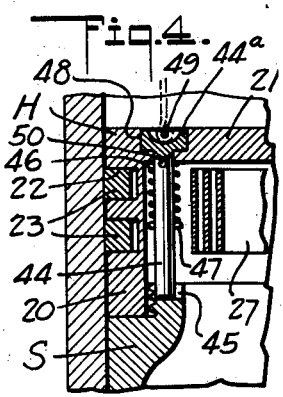
INVENTOR
JAMES A. BUCHANAN
BY
Edwin D. Jones.
ATTORNEY Patented Apr. 6, 1937

2,076,118

UNITED STATES PATENT OFFICE 2,076,118

PISTON

James A. Buchanan, Los Angeles, Calif., assignor of forty-nine per cent to Jerry M. Hopper, Los Angeles, Calif.

Application March 30, 1936, Serial No. 71,620

6 Claims. (Cl. 309—7)

My invention relates to pistons particularly designed, although not necessarily, for use in internal combustion engines.

It is a purpose of my invention to provide a piston having simple, inexpensive and effective means for adjustably expanding the rings of the piston to compensate for wear either in the rings or the cylinder in which the piston operates, to the end of maintaining an adequate seal of the piston.

It is also a purpose of my invention to provide a piston having a skirt portion and a head portion, the latter carrying the rings and the adjustable expanding means therefor, and being detachable from the skirt portion even when the piston is in an engine cylinder to allow access to the rings and the parts of the expanding means for cleaning thereof or the substitution of new rings or parts when and as required.

I will describe only one form of piston embodying my invention, and will then point out the novel features thereof in claims.

In the accompanying drawing:

Fig. 1 is a view showing in vertical section one form of piston embodying my invention in applied position within the cylinder of an engine.

Fig. 2 is a horizontal sectional view taken on the line 2—2 of Fig. 1.

Fig. 3 is a fragmentary view showing in top plan the latch bolt embodied in the piston shown in the preceding views.

Fig. 4 is a fragmentary vertical sectional view taken on the line 4—4 of Fig. 2.

Referring specifically to the drawing, my invention in its present embodiment comprises a piston composed of a skirt portion S, and a head portion H. The skirt portion S is of conventional skirt form with the exception that its upper end is provided with an annular lip 16 exteriorly threaded and offset inwardly to provide a shoulder 17. The skirt portion is provided with the usual wrist-pin bearings for receiving a wrist-pin 18 to which the connecting rod 19 is connected.

The head portion H is composed of an annular collar 20 and disk 21 formed integral with the collar to provide a body of cupped form. The outside diameter of the collar 20 corresponds to that of the skirt portion S, and at its inner side it is screw-threaded as shown in Fig. 1 to have threaded engagement with the lip 16 in a manner to have abutting relationship with respect to the shoulder 17.

The collar 20 is provided, in the present instance, with two annular grooves 22 in which are received expansible rings 23 of conventional form. Through radial openings 24 pins 25 are freely movable to engage the inner periphery of the rings 23 for the purpose of expanding the rings when the pins are radially moved. The inner ends of these pins are provided with heads 26 for limiting movement of the pins radially outward and also to provide relatively large surfaces against which a spring 27 bears for the purpose of urging the pins outwardly to expand the rings. Any number of pins may be employed for each of the rings, and, as shown in Fig. 2, they are equidistantly spaced circumferentially about the spring so that through the pins the spring exerts a substantially uniform outward pressure on the rings in effecting expansion of the latter.

The spring 27 is arranged within the area defined by the collar 20 so that its outermost convolution bears against the pins for both rings. The spring is mounted within the head portion H by securing its outer end to the inner side of the collar through the use of a rivet 28. The inner end of the spring is secured to an annular extension 29 of an arm 30 by extending the spring end through a suitable slot in the extension and then bending it about the extension, as shown in Fig. 2.

The arm 30 is supported on and extends radially from a latch bolt which is so mounted axially in the disk 21 as to be capable of circumferential adjustment and to thereby effect movement of the arm in producing a variation in tension of the spring 27. The bolt has a shank formed with a non-circular portion 31, which is received in a correspondingly shaped opening 32 in the arm 30. The lower end of the bolt shank is of reduced diameter to provide an annular shoulder 32ª and screw-threaded as shown to receive a nut 33 secured thereon by a cotter pin 34. A washer 35 is interposed between the shoulder and the nut to form a seat for a coiled expansible spring 36, which serves the dual purpose of holding the arm 30 on the shank portion 31 and urging the bolt downwardly to the axial position shown in Fig. 1.

That portion 37 of the bolt shank extending above the shank portion 31 is rotatably fitted in a central opening 38 of the disk 21, and the shank portion 31 is of such size that it can move into the opening to allow axial movement of the bolt when required. The shank portion 37 terminates in a head 39 having a slot 40 in its upper side for the reception of a screw driver for turning the bolt, and a serrated underside in which the teeth 41 thereof extend radially. The bolt head 39 is adapted to fit in a recess 42 of the disk 21, and the bottom wall of this recess is also provided with radial teeth 43 which coact with the teeth 41 for securing the bolt in any circumferential position of adjustment.

As will now be manifest, the spring 36 urges the bolt downwardly to retain the head 39 within the recess 42 and the teeth 41 and 43 in engagement with each other to secure the bolt against rotation. However, the shape of the teeth and the tension of the spring are such that by exerting sufficient turning force on the bolt head through the use of a screw driver, the bolt can be turned to effect movement of the arm 30 in producing the required adjustment of the spring 27. During this operation the teeth 41 and 43 operate to cam the bolt head upwardly against the tension of the spring 36. Once the proper adjustment has been attained the spring, still urging the bolt head downwardly, causes the teeth thereof to have latching engagement with the teeth of the recess to retain the bolt in this newly adjusted position.

As the inner end of the spring 27 is moved circumferentially in one direction or the other by adjustment of the arm 30 in the manner just described, the tension of the spring is varied accordingly, and in this manner the pressure exerted radially outward by the outermost convolution of the spring is increased or decreased to vary the pressure exerted by the several pins 25 on the rings 23. Thus it will be apparent that in accordance with the adjustment of the spring 27 the piston rings can be expanded as required to effect and maintain an adequate seal of the piston within a cylinder. In practice, the bolt is adjusted from time to time to increase the tension of the spring 27 and to thereby further expand the piston rings to compensate for their wear, as well as the wear of the cylinder, and in this manner to maintain an adequate seal of the piston within the cylinder.

The adjustable expanding means for the piston rings as above described is carried wholly by the head portion H of the piston, and as previously described herein the head portion is threaded on the skirt portion S so that the two portions are detachable one from the other to allow removal of the head portion from the engine cylinder when required to permit removal of the rings, the pins and other parts of the adjustable expanding means, of any and all carbon that may accumulate thereon after prolonged operation of the piston in the cylinder. Also, substitution of new rings or parts of the expanding means can be effected when the head portion is removed from the cylinder.

To lock the head portion on the skirt portion, the following means is provided: A locking pin 44 is extended through a suitable opening in the disk 21 (Fig. 4) so that the lower end thereof extends into a slot 45 of the lip 16 thereby securing the head portion against unscrewing from the skirt portion. By means of a spring 46 retained on the pin 44 by cross pin 47, the locking pin is urged downwardly into the slot 45 to prevent accidental displacement thereof from the slot.

The head 44ᵃ of the locking pin fits in a recess 48 of the disk, and this head is cupped and provided with a cross pin 49. Any suitable hook-shaped instrument can be employed to engage the cross pin 49 and pull the locking pin upwardly against the tension of the spring 46 to remove the pin from the slot, and in this manner to release the head portion H so that it can be unscrewed from the skirt portion. Slots 51 (Fig. 1) are provided in the disk 21 to permit a spanner wrench to be employed in effecting unscrewing of the head portion. The locking bolt can be maintained in this elevated position by extending a cotter pin for example, through an opening 50 in the shank of the pin. It will be understood that the bolt is retained in this elevated position also during application of the head portion of the skirt portion.

Although I have herein shown and described only one form of piston embodying my invention it is to be understood that various changes and modifications may be made herein without departing from the spirit of my invention and the spirit and scope of the appended claims.

I claim:

1. A piston having grooves therein; rings in the grooves; and adjustable means for expanding the rings radially in the grooves, said means comprising pins movable radially in the piston and engaging the rings, and a spiral spring urging the pins radially outward to expand said rings, and means for so supporting said spring on the piston that it engages and urges the pins radially outward to expand said rings.

2. A piston having grooves therein; rings in the grooves; adjustable means for expanding the rings radially in the grooves, said means comprising pins movable radially in the piston and engaging the rings, and a spiral spring urging the pins radially outward to expand said rings; and means carried by the piston for varying the tension of said spring in a manner to vary the urging action thereof in respect to said pins.

3. In a piston having grooves therein, and rings in the grooves; pins movable radially in the piston for expanding said rings; a spiral spring arranged within the piston so that its outermost convolution contacts with all of said pins for urging the pins radially outward; means securing the outer end of said spring to said piston; and means carried by the piston and connected to the inner end of said spring for moving the latter to vary the urging action with respect to said pins.

4. In a piston having grooves therein, and rings in the grooves; pins movable radially in the piston for expanding said rings; a spiral spring arranged within the piston so that its outermost convolution contacts with all of said pins for urging the pins radially outward; means securing the outer end of said spring to said piston; and means carried by the piston and connected to the inner end of said spring for moving the latter to vary the tension of the spring in a manner to vary its urging action with respect to said pins, said means comprising a bolt mounted in the piston for circumferential adjustment and to occupy either of two axial positions, coacting means on the bolt and piston for latching the bolt in any circumferential position of adjustment when the bolt is in one of its two axial positions, means yieldably urging the bolt to the last-mentioned axial position to permit the bolt to be moved to the other axial position for allowing circumferential adjustment of the bolt, and an arm fixed to the bolt and to the inner end of the spring so that by circumferential adjustment of the bolt the inner end of the spring is moved accordingly.

5. A piston having a skirt portion; a head portion having grooves therein; rings in the grooves; pins movable radially in the head portion for expanding the rings; a spiral spring arranged in the head portion so that its outermost convolution contacts with all of the pins; means securing the outer end of the spring to the head portion; a bolt mounted in the head portion for circumferential adjustment and to occupy either of two axial positions; coacting means on the bolt and head portion for latching the bolt in any circumferential position of adjustment when the bolt is in one of its two axial positions; means yieldably urging the bolt to the last mentioned axial position in a manner to permit the bolt to be moved to the other axial position for allowing circumferential adjustment of the bolt; an arm fixed to the bolt and to the inner end of the spring so that by circumferential adjustment of the bolt the inner end of the spring is moved accordingly; coacting means on the head and skirt portions detachably connecting one portion to the other; and coacting means on the head and skirt portions locking the two against detachment.

6. A piston as embodied in claim 5, wherein the last mentioned coacting means comprises a slot in the skirt portion, and a spring pressed pin in the head portion engaging within said slot.

JAMES A. BUCHANAN.